United States Patent
Kuwayama et al.

(10) Patent No.: US 12,352,945 B2
(45) Date of Patent: Jul. 8, 2025

(54) MICROSCOPE DEVICE, SPECTROSCOPE, AND MICROSCOPE SYSTEM

(71) Applicant: SONY GROUP CORPORATION, Tokyo (JP)

(72) Inventors: Tetsuro Kuwayama, Tokyo (JP); Hirokazu Tatsuta, Tokyo (JP); Gakuji Hashimoto, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 532 days.

(21) Appl. No.: 17/756,226

(22) PCT Filed: Nov. 20, 2020

(86) PCT No.: PCT/JP2020/043346
§ 371 (c)(1),
(2) Date: May 19, 2022

(87) PCT Pub. No.: WO2021/106772
PCT Pub. Date: Jun. 3, 2021

(65) Prior Publication Data
US 2022/0413275 A1 Dec. 29, 2022

(30) Foreign Application Priority Data
Nov. 29, 2019 (JP) .................. 2019-217406

(51) Int. Cl.
*G02B 21/08* (2006.01)
*G01J 3/02* (2006.01)
(Continued)

(52) U.S. Cl.
CPC .......... *G02B 21/082* (2013.01); *G01J 3/0208* (2013.01); *G01J 3/04* (2013.01);
(Continued)

(58) Field of Classification Search
None
See application file for complete search history.

(56) References Cited

U.S. PATENT DOCUMENTS

| 5,251,007 A | 10/1993 | Rinke |
| 2013/0162990 A1 | 6/2013 | Kobayashi et al. |

(Continued)

FOREIGN PATENT DOCUMENTS

| CN | 1764961 A | 4/2006 |
| CN | 103983354 A | 8/2014 |

(Continued)

OTHER PUBLICATIONS

International Search Report and Written Opinion of PCT Application No. PCT/JP2020/043346, issued on Feb. 2, 2021, 09 pages of ISRWO.

(Continued)

*Primary Examiner* — Richard H Kim
(74) *Attorney, Agent, or Firm* — CHIP LAW GROUP

(57) ABSTRACT

A microscope device includes an opening (31) that includes a first slit and a second slit through which a plurality of pieces of light from an observation target resulting from a plurality of pieces of irradiation light emitted to the observation target and having different wavelengths pass, a dispersion element that wavelength-disperses the plurality of pieces of light passing through the opening (31), and an imaging element (32) that receives the plurality of pieces of light wavelength-dispersed by the dispersion element. The imaging element (32) performs light reception so that, as for the plurality of pieces of light wavelength-dispersed, zeroth-order light of light passing through the second slit and first-order light of light passing through the first slit do not overlap with each other.

16 Claims, 14 Drawing Sheets

(51) Int. Cl.
G01J 3/04 (2006.01)
G01J 3/18 (2006.01)
G01J 3/28 (2006.01)

(52) U.S. Cl.
CPC ............... *G01J 3/18* (2013.01); *G01J 3/2823* (2013.01); *G01J 2003/045* (2013.01)

(56) References Cited

U.S. PATENT DOCUMENTS

2014/0333927 A1   11/2014   Shimbo
2017/0276610 A1   9/2017    Fujita

FOREIGN PATENT DOCUMENTS

| JP | 4452850 B2 | 4/2010 |
| JP | 2012-003198 A | 1/2012 |
| JP | 2012-047668 A | 3/2012 |
| JP | 2015184620 A | 10/2015 |
| WO | 2012/029286 A1 | 3/2012 |
| WO | WO-2014115871 A1 | 7/2014 |

OTHER PUBLICATIONS

Stack, et al., "Multiplexed immunohistochemistry, imaging, and quantitation: A review, with an assessment of Tyramide signal amplification, multispectral imaging and multiplex analysis", Elsevier, Science Direct, vol. 70, Issue 1, Nov. 2014, pp. 46-58.

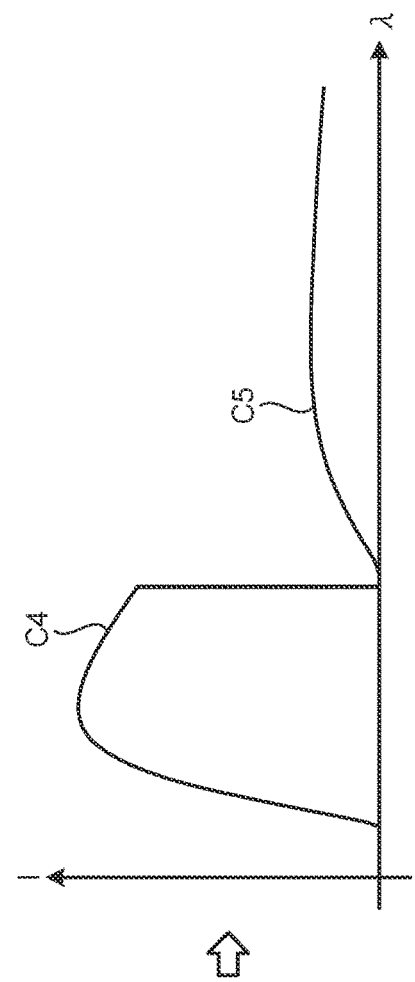
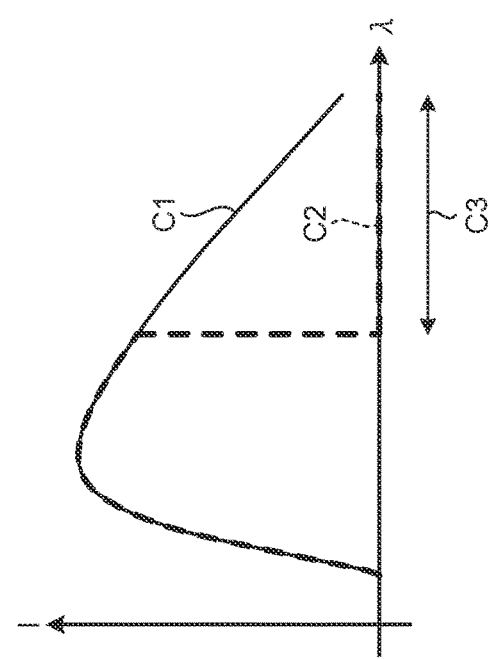
FIG. 19B
FIG. 19A

MICROSCOPE DEVICE, SPECTROSCOPE, AND MICROSCOPE SYSTEM

CROSS REFERENCE TO RELATED APPLICATIONS

This application is a U.S. National Phase of International Patent Application No PCT/JP2020/043346 filed on Nov. 20, 2020, which claims priority benefit of Japanese Patent Application No. JP 2019-217406 filed in the Japan Patent Office on Nov. 29, 2019. Each of the above-referenced applications is hereby incorporated herein by reference in its entirety.

FIELD

The present disclosure relates to a microscope device, a spectroscope, and a microscope system.

BACKGROUND

Conventionally, in relation to a technique for acquiring imaging data of an observation target, there is fluorescence microscopy used for pathological image acquisition or imaging cytometry, for example. As methods excellent in quantitative and multicolor analyses, various image diagnosis methods using fluorescence staining have been proposed.

The fluorescence microscopy is more advantageous than staining by coloring in that multiplexing is easier, and in that detailed diagnostic information can be obtained. In fluorescence imaging other than that for pathological diagnosis as well, an increase in the number of colors makes it possible to examine various antigens appearing in a sample at once. In general fluorescence imaging, excitation light is emitted at an absorption wavelength (excitation wavelength) of a dye, and a dye spectrum generated from emitted light is selectively captured using a bandpass filter. In a case where there are a plurality of colors, the absorption wavelength (excitation wavelength) varies depending on the dye. Therefore, a method of photographing by changing the filter for each dye is employed. However, the absorption spectra, as well as the emission spectra, of dyes are broad and overlap with each other. Hence, in a case where staining is performed using a plurality of colors, a plurality of dyes are excited at one excitation wavelength. Furthermore, fluorescence of an adjacent dye spills over into the bandpass filter, and color mixing (overlapping of fluorescence) occurs.

On the other hand, there is known a method of photographing by changing the wavelength of excitation light and the wavelength of fluorescence to be detected in a time-division manner. However, this method has a problem in which the photographing time increases linearly as the number of colors increases. As an observation method in consideration of the above circumstances, there is fluorescence microscopy using a plurality of pieces of excitation light and a plurality of slits. According to this method, a large number of pieces of excitation light can be emitted at a time, and data of fluorescence generated by all excitation can be acquired in single scanning.

CITATION LIST

Patent Literature

Patent Literature 1: JP 4452850 B2
Non Patent Literature

Non Patent Literature 1: Edward C. Stack, "Multiplexed immunohistochemistry, imaging, and quantitation: A review, with an assessment of Tyramide signal amplification, multispectral imaging and multiplex analysis", Methods 70 (2014) 46-58

SUMMARY

Technical Problem

However, the above-described conventional fluorescence microscopy using a plurality of pieces of excitation light and a plurality of slits has a problem in which, for example, in an imaging unit, the first-order light of light passing through one slit and the zeroth-order light of light passing through another slit overlap with each other, and in which accurate imaging data cannot be obtained.

Therefore, the present disclosure has been made in view of the above circumstances, and proposes a microscope device, a spectroscope, and a microscope system capable of obtaining accurate imaging data by means of an imaging unit in a case where an observation target is irradiated with a plurality of pieces of irradiation light having different wavelengths, and where respective pieces of light from the observation target are caused to pass through a plurality of slits and are then subjected to wavelength dispersion.

Solution to Problem

To solve the problems described above, a microscope device according to the present disclosure includes: an opening that includes a first slit and a second slit through which a plurality of pieces of light from an observation target resulting from a plurality of pieces of irradiation light emitted to the observation target and having different wavelengths pass; a dispersion element that wavelength-disperses the plurality of pieces of light passing through the opening; and an imaging element that receives the plurality of pieces of light wavelength-dispersed by the dispersion element. The imaging element performs light reception so that, as for the plurality of pieces of light wavelength-dispersed, zeroth-order light of light passing through the second slit and first-order light of light passing through the first slit do not overlap with each other.

BRIEF DESCRIPTION OF DRAWINGS

FIGS. 19A and 19B are graphs for describing a specific example of data correction for the second-order light in the embodiment.

DESCRIPTION OF EMBODIMENTS

Hereinbelow, embodiments of the present disclosure will be described in detail with reference to the drawings. In the present embodiment, a fluorescence observation device that observes fluorescence from an observation target will be described as an example of a microscope device.

Figure 1:
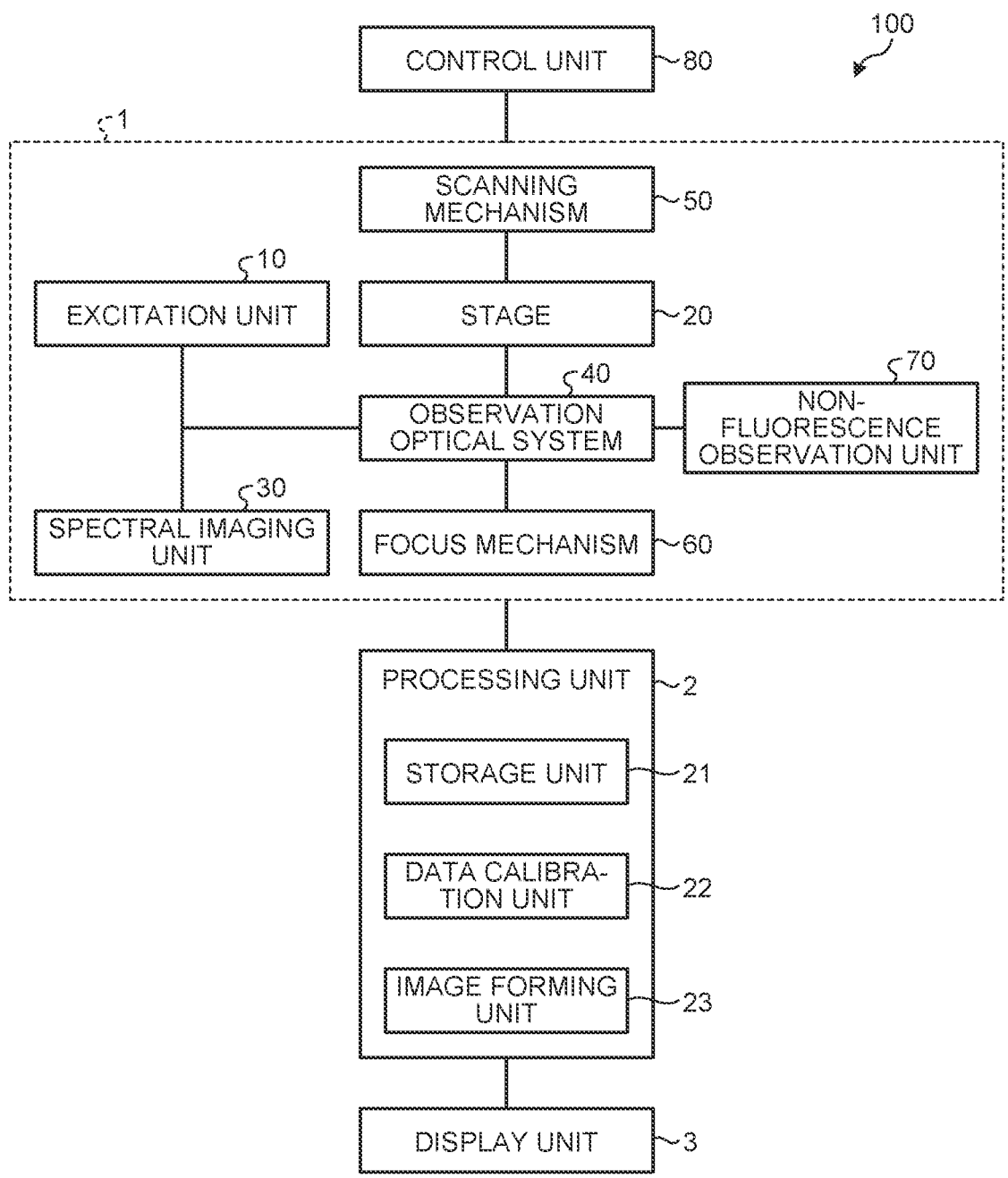
FIG. 1 is a schematic block diagram illustrating a fluorescence observation device according to an embodiment.
Figure 2:
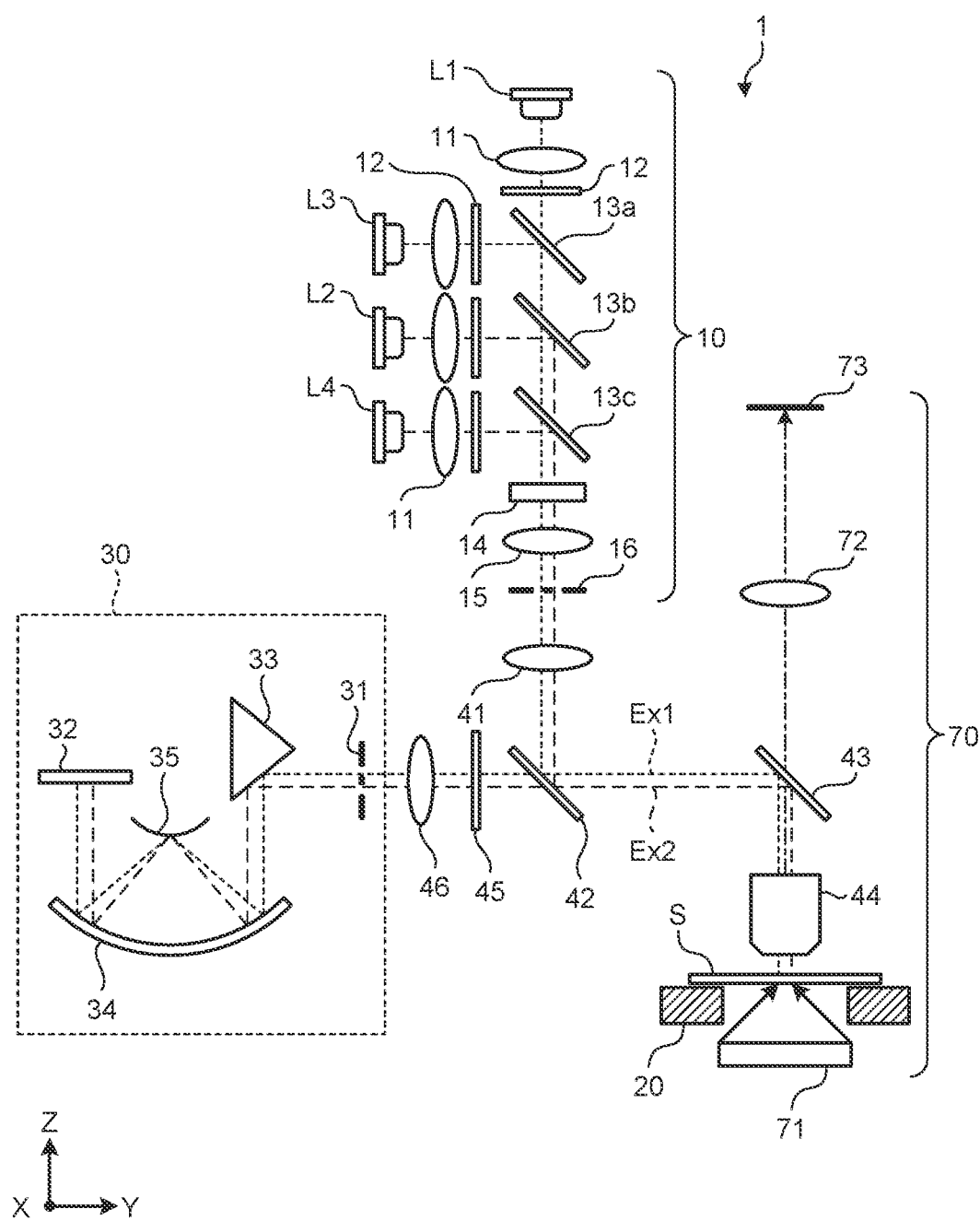
FIG. 2 is a diagram illustrating an example of an optical system in the fluorescence observation device according to the embodiment.

First, a configuration of a fluorescence observation device 100 according to the embodiment will be described with reference to FIGS. 1 and 2. FIG. 1 is a schematic block diagram illustrating the fluorescence observation device 100 according to the embodiment. FIG. 2 is a diagram illustrating an example of an optical system in the fluorescence observation device 100 according to the embodiment.

The fluorescence observation device 100 according to the present embodiment includes an observation unit 1. The observation unit 1 includes an excitation unit 10, a stage 20, and a spectral imaging unit 30 (hereinbelow, it is also referred to as a spectroscope). The excitation unit 10 (irradiation unit) irradiates an observation target with a plurality of pieces irradiation light having different wavelengths. For example, the excitation unit 10 irradiates a pathological specimen (pathological sample) serving as an observation target with a plurality of pieces of line illumination light having different wavelengths arranged in a parallel and spatially-separated state.

Here, the parallel and spatially-separated state means a state in which the plurality of pieces of line illumination light have different axes and are in parallel. Having different axes means not being on the same axis, and the distance between the axes is not particularly limited. Being in parallel is not limited to being in parallel in a strict sense, and includes a state of being substantially in parallel. For example, there may be distortion caused by an optical system such as a lens or deviation from a parallel state due to manufacturing tolerance, and such a case is also regarded as being in parallel.

The stage 20 is a pedestal for supporting a pathological specimen. The spectral imaging unit 30 acquires a fluorescence spectrum (spectral data) for the pathological specimen excited in a line form.

The fluorescence observation device 100 further includes a processing unit 2. Based on the fluorescence spectrum for the pathological specimen (hereinbelow, it is also referred to as a sample S) acquired by the observation unit 1, the processing unit 2 typically forms an image of the pathological specimen or outputs a distribution of the fluorescence spectrum. The image mentioned herein refers to a component ratio of dyes, autofluorescence derived from the sample, and the like constituting the spectrum, RGB (red, green, and blue) colors converted from the waveform, a luminance distribution in a specific wavelength band, or the like.

The excitation unit 10 and the spectral imaging unit 30 are connected to the stage 20 via an observation optical system 40 such as an objective lens 44. The observation optical system 40 has a function of maintaining optimum focusing by means of a focus mechanism 60. A non-fluorescence observation unit 70 for performing dark field observation, bright field observation, and the like may be connected to the observation optical system 40.

Also, the fluorescence observation device 100 may be connected to a control unit 80 that controls the excitation unit 10, the spectral imaging unit 30, a scanning mechanism 50, the focus mechanism 60, the non-fluorescence observation unit 70, and the like.

The excitation unit 10 includes a plurality of light sources L1, L2, . . . that can output light having a plurality of excitation wavelengths Ex1, Ex2, . . . . Each of the plurality of light sources typically includes a light emitting diode (LED), a laser diode (LD), a mercury lamp, or the like, and each piece of light is illuminated in a line form and emitted to a sample S on the stage 20.

Figure 4:
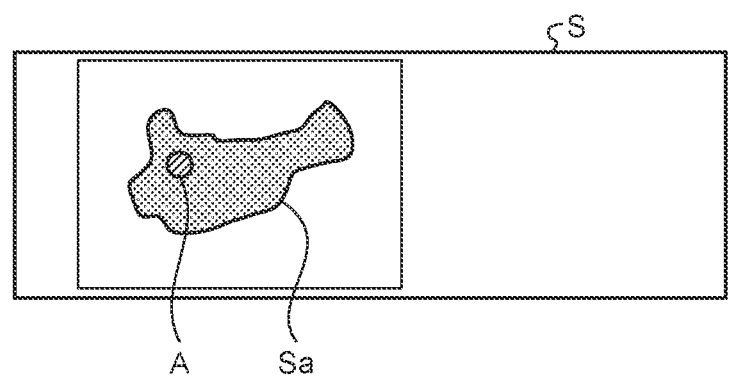
FIG. 4 is a schematic view of a pathological specimen serving as an observation target according to the embodiment.
Figure 5:
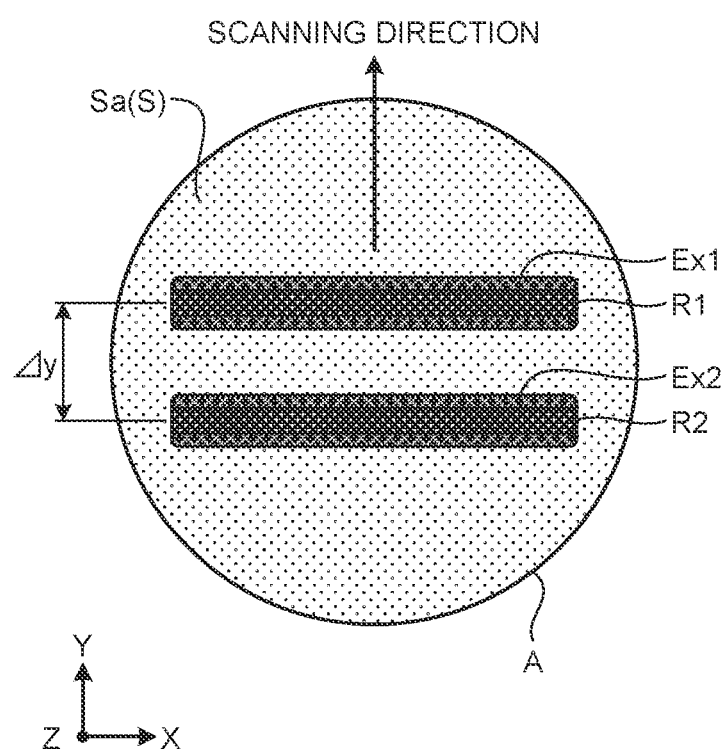
FIG. 5 is a schematic view illustrating a state of line illumination light emitted to the observation target according to the embodiment.

Here, FIG. 4 is a schematic view of a pathological specimen serving as an observation target according to the embodiment. Also, FIG. 5 is a schematic view illustrating a state of line illumination light emitted to the observation target according to the embodiment. The sample S typically includes a slide including an observation target Sa such as a tissue section as illustrated in FIG. 4, but may be in another form. The observation target Sa is a biological sample such as a nucleic acid, a cell, protein, a bacterium, and a virus. The sample S (observation target Sa) is stained with a plurality of fluorophores. The observation unit 1 enlarges and observes the sample S at a desired magnification. When the portion A in FIG. 4 is enlarged, a plurality of pieces of line illumination light (two (Ex1 and Ex2) in the illustrated example) are arranged in the illumination areas as illustrated in FIG. 5. Photographing areas R1 and R2 for the spectral imaging unit 30 are arranged so as to be superimposed on the respective illumination areas. The two pieces of line illumination light Ex1 and Ex2 are emitted in parallel in the direction of the Z axis, and are arranged away from each other in the direction of the Y axis by a predetermined distance ($\Delta y$).

Also, the spectral imaging unit 30 includes an opening 31, an imaging element 32, a prism 33, a mirror 34, and a diffraction grating 35. The opening 31 illustrated in FIG. 2 includes a plurality of slits through which a plurality of pieces of light from the observation target resulting from a plurality of pieces of irradiation light pass. The photographing areas R1 and R2 correspond to the slits of the opening 31, respectively. That is, as many slits of the spectral imaging unit 30 as the number of pieces of line illumination light are arranged.

The wavelength of the first line illumination light Ex1 and the wavelength of the second line illumination light Ex2 are different from each other. The line-formed fluorescence excited by the line illumination light Ex1 and Ex2 is observed in the spectral imaging unit 30 via the observation optical system 40.

The imaging element 32 (imaging unit) images (receives) a plurality of pieces of light (fluorescence or the like) wavelength-dispersed by the diffraction grating 35 (dispersion element). As the imaging element 32, a two-dimensional imager such as a charge coupled device (CCD) imager and a complementary metal oxide semiconductor (CMOS) imager is employed.

The spectral imaging unit 30 acquires from each piece of line illumination light Ex1 and Ex2 spectral data (x, λ) of fluorescence using a pixel array in one direction (for example, the vertical direction) of the imaging element 32 as a channel of a wavelength. The obtained spectral data (x, λ) is recorded in the processing unit 2 in a state of clarifying that the spectral data is data obtained by excitation at which excitation wavelength.

The processing unit 2 (correction unit) processes imaging data received from the imaging element 32. For example, the processing unit 2 is achieved by a hardware element used in a computer such as a central processing unit (CPU), a random access memory (RAM), and a read only memory (ROM), and a required program (software). Instead of or in addition to the CPU, a programmable logic device (PLD) such as a field programmable gate array (FPGA), a digital signal processor (DSP), an application specific integrated circuit (ASIC), or the like may be used.

The processing unit 2 includes a storage unit 21. The storage unit 21 stores spectral data indicating the correlation between the wavelengths of the plurality of pieces of line illumination light Ex1 and Ex2 and the fluorescence received by the imaging element 32. As the storage unit 21, a storage device such as a nonvolatile semiconductor memory and a hard disk drive is used, and the storage unit 21 has prestored therein a standard spectrum for autofluorescence of the sample S and a standard spectrum for a dye itself staining the sample S. The spectral data (x, λ) received by the imaging element 32 is stored in the storage unit 21. In the present embodiment, the storage unit that stores autofluorescence of the sample S and a standard spectrum for a dye itself and the storage unit that stores spectral data (measured spectrum) for the sample S acquired by the imaging element 32 are constituted by the common storage unit 21, but the present disclosure is not limited thereto, and they may be constituted by separate storage units. Also, as for light information respectively obtained from a plurality of pieces of wavelength-dispersed light, the processing unit 2 can correct light information obtained from light passing through a first slit on the basis of light information obtained from light passing through a second slit (the details will be described below).

Also, as illustrated in FIG. 2, a dichroic mirror 42 and a bandpass filter 45 are inserted in the middle of the optical path so that the excitation light (Ex1 and Ex2) does not reach the imaging element 32.

The diffraction grating 35 is arranged on the optical path between the opening 31 and the imaging element 32. The diffraction grating 35 is an example of a wavelength dispersion element that wavelength-disperses a plurality of pieces of light having passed through the plurality of slits of the opening 31. The diffraction grating 35 causes wavelength dispersion due to the coherence of light. In general, a diffraction grating has an advantage that dependency of wavelength dispersion on wavelength is substantially fixed, and that it is easy to design wavelength dispersion on the basis of a grating pitch. That is, by using the diffraction grating 35, it is possible to easily design how the wavelength dispersion is to occur when light is incident on the imaging element 32.

Also, the diffraction grating 35 is, for example, a blazed diffraction grating (blazed grating) in which a cross-sectional shape of a groove is a sawtooth shape. By using the blazed diffraction grating, a large amount of light of a specific order can be obtained. For example, the wavelength component of the second-order light can be suppressed. Therefore, even when the second-order light of another slit overlaps with the first-order light of a certain slit, the influence of color mixing can be suppressed to be small, and the spectrum of each slit can accurately be obtained. In addition, the blazed diffraction grating can suppress the negative-first-order light to be smaller than the first-order light. Therefore, for example, even when the first-order light of a certain slit and the negative-first-order light of another slit #2 overlap with each other, the influence of the negative-first-order light can be small.

Figure 3:
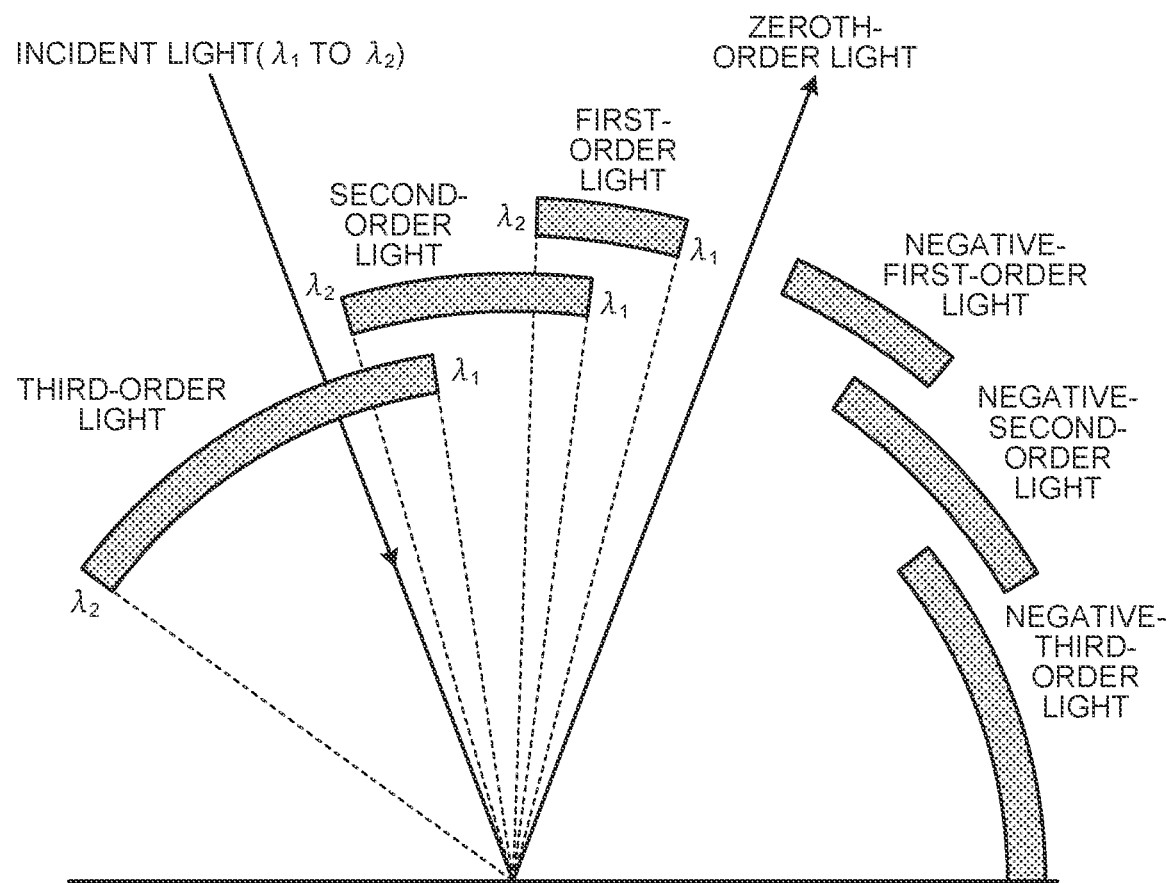
FIG. 3 is an explanatory diagram of light dispersion by a diffraction grating.

Here, FIG. 3 is an explanatory diagram of light dispersion by the diffraction grating. When the diffraction grating is used, the negative-third-order light to the third-order light are generated in response to incident light (wavelengths $\lambda_1$ to $\lambda_2$), for example. Hereinbelow, problems of a conventional art will be described in detail.

In fluorescence microscopy using a plurality of pieces of excitation light and a plurality of slits, it is necessary to disperse the excitation light by a spectroscope and perform observation using the first-order light or the negative-first order light. However, actually, the zeroth-order light that is not dispersed and the higher-order light (second-order light or higher) that is not desired are generated. Then, since the respective pieces of light passing through the plurality of slits are dispersed, the diffracted light obtained from another slit overlaps with the region of the diffracted light obtained from a certain slit in the imaging unit, and an accurate spectrum cannot be obtained. This problem has not become obvious because, conventionally, in many spectroscopes, one slit is formed for one spectral element.

For example, a case where there are two slits will be considered as an example. Ideally, the images of two pieces of dispersed first-order light (or negative-first-order light) would be projected on the imager (imaging element). However, actually, the zeroth-order light and the higher-order light are generated, and thus acquiring only ideal first-order light images is not always the case. For example, the zeroth-order light of light from the slit #1 may overlap with the first-order light (or the negative-first-order light) of light from the slit #2, or the higher-order light (for example, the second-order light) of light from the slit #1 and the first-order light (or the negative-first-order light) of light from the slit #2 may overlap with each other. In a case where such overlapping occurs in this manner, the spectrum of the first-order light (or the negative-first-order light), which is to be observed, cannot be measured accurately.

Under such circumstances, in the present embodiment, a method will be described in which the imaging unit can acquire accurate (more accurate than the conventional art) imaging data by avoiding or reducing such overlapping.

Returning to FIGS. 1 and 2, the observation unit 1 further includes the scanning mechanism 50. The scanning mechanism 50 changes a position of the observation target irradiated with irradiation light over time. For example, the scanning mechanism 50 can cause the plurality of pieces of line illumination light Ex1 and Ex2 to be scanned over the stage 20 in the direction of the Y-axis, that is, in the arrangement direction of the line illumination light Ex1 and Ex2. By driving the scanning mechanism 50, the imaging element 32 continuously images a plurality of pieces of wavelength-dispersed light in the scanning direction over time, and the processing unit 2 processes the imaging data received from the imaging element 32 to acquire two-dimensional data or three-dimensional data of the observation target.

Specifically, by using the scanning mechanism 50, dye spectra (fluorescence spectra) spatially separated by Δy on the sample S (observation target Sa) and excited at different excitation wavelengths can be continuously recorded in the direction of the Y-axis.

Note that, in the above example, although the number of pieces of line illumination light serving as the excitation light is two, the number of pieces of line illumination light is not limited to two, and may be three, four, or five or more. In addition, each of the pieces of line illumination light may include a plurality of excitation wavelengths selected so that color separation performance is not degraded as much as possible.

Next, details of the observation unit 1 will be described with reference to FIG. 2. The excitation unit 10 includes a plurality of (four in the present example) excitation light sources L1, L2, L3, and L4. The excitation light sources L1 to L4 include laser light sources that output laser light having a wavelength of 405 nm, 488 nm, 561 nm, and 645 nm, respectively.

The excitation unit 10 further includes a plurality of collimator lenses 11, laser line filters 12, dichroic mirrors 13*a*, 13*b*, and 13*c*, a homogenizer 14, a condenser lens 15, and an incident slit 16 so as to correspond to the respective excitation light sources L1 to L4.

The laser light emitted from the excitation light source L1 and the laser light emitted from the excitation light source L3 are collimated by the collimator lens 11, pass through the laser line filters 12 for cutting the edges of the respective wavelength bands, and are made coaxial by the dichroic mirror 13*a*. The two pieces of coaxial laser light are further beam-shaped by the homogenizer 14 such as a fly-eye lens and the condenser lens 15 to become the line illumination light Ex1.

Similarly, the laser light emitted from the excitation light source L2 and the laser light emitted from the excitation light source L4 are made coaxial by the dichroic mirrors 13*b* and 13*c*, and become the line illumination light Ex2 having a different axis from that of the line illumination light Ex1. The line illumination light pieces Ex1 and Ex2 form different-axis line illumination light (primary image) separated by Δy in the incident slit 16 (conjugated slits) having a plurality of slits through which the line illumination light pieces Ex1 and Ex2 can pass. Note that, in the present embodiment, an example in which the four lasers are made to be two coaxial lasers and two different-axis lasers is described, but instead, two lasers may be made to be two different-axis lasers, or four lasers may be made to be four different-axis lasers.

The primary image is emitted to the sample S on the stage 20 through the observation optical system 40. The observation optical system 40 includes a condenser lens 41, dichroic mirrors 42 and 43, the objective lens 44, the bandpass filter 45, and a condenser lens 46 (image forming lens). The line illumination light pieces Ex1 and Ex2 are collimated by the condenser lens 41 paired with the objective lens 44, are reflected by the dichroic mirrors 42 and 43, pass through the objective lens 44, and are emitted to the sample S.

The illumination light as illustrated in FIG. 5 is formed on the surface of the sample S. The fluorescence excited by these pieces of illumination light is condensed by the objective lens 44, is reflected by the dichroic mirror 43, passes through the dichroic mirror 42 and the bandpass filter 45 that cuts off the excitation light, is condensed again by the condenser lens 46, and is incident on the spectral imaging unit 30.

The opening 31 is arranged at the condensing point of the condenser lens 46 and has the same number of slits as the number of excitation lines. The fluorescence spectra derived from the two excitation lines that have passed through the opening 31 are reflected by the prism 33 and the mirror 34, then wavelength-separated by the diffraction grating 35, reflected again by the mirror 34, and then incident on the imaging element 32.

The stage 20 and the scanning mechanism 50 constitute an X-Y stage, and move the sample S in the direction of the X-axis and the direction of the Y-axis in order to acquire a fluorescence image of the sample S. In whole slide imaging (WSI), an operation of scanning the sample S in the direction of the Y-axis, then moving in the direction of the X-axis, and further scanning the sample S in the direction of the Y-axis is repeated.

The non-fluorescence observation unit 70 includes a light source 71, the dichroic mirror 43, the objective lens 44, a condenser lens 72, an imaging element 73, and the like. The non-fluorescence observation system in FIG. 2 is an observation system by using dark field illumination.

The light source 71 is arranged below the stage 20, and irradiates the sample S on the stage 20 with illumination light from the opposite side of the line illumination light Ex1 and Ex2. In the case of dark field illumination, the light source 71 illuminates the sample S from the outside of the numerical aperture (NA) of the objective lens 44, and the light (dark field image) diffracted by the sample S is photographed by the imaging element 73 via the objective lens 44, the dichroic mirror 43, and the condenser lens 72. By using the dark field illumination, even an apparently transparent sample such as a fluorescently-stained sample can be observed with contrast.

Note that this dark field image may be observed simultaneously with the fluorescence and used for real-time focusing. In this case, as the illumination wavelength, a wavelength that does not affect fluorescence observation may be selected. The non-fluorescence observation unit 70 is not limited to the observation system that acquires the dark field image, and may include an observation system that can acquire a non-fluorescence image such as a bright field image, a phase difference image, a phase image, and an in-line hologram image. For example, as a method for acquiring a non-fluorescence image, various observation methods such as a Schlieren method, a phase difference contrast method, a polarization observation method, and an epi-illumination method can be adopted. The position of the illumination light source is not limited to the position below the stage, and the light source may be located above the stage or around the objective lens. Furthermore, not only a method of performing focus control in real time, but also another method such as a prefocus map method of recording focus coordinates (Z coordinates) in advance may be adopted.

The fluorescence spectrum acquired by the imaging element 32 is output to the processing unit 2. The processing unit 2 includes a data calibration unit 22 and an image forming unit 23 in addition to the storage unit 21. The data calibration unit 22 calibrates the spectral data stored in the storage unit 21. The image forming unit 23 forms a fluorescence image of the sample S on the basis of the spectral data and the interval Δy between the plurality of pieces of line illumination light Ex1 and Ex2.

A display unit 3 displays various kinds of information created by the processing unit 2. The display unit 3 may include, for example, a monitor integrally attached to the processing unit 2, or may be a display device connected to the processing unit 2. The display unit 3 includes, for example, a display element such as a liquid crystal device and an organic EL device, and a touch sensor, and functions as a user interface (UI) that lets photographing conditions input and set and displays a photographed image and the like.

Hereinbelow, a structure of the observation unit 1 for obtaining accurate imaging data by means of the imaging element 32 will be described in detail. The observation unit 1 is configured so that, as for a plurality of pieces of wavelength-dispersed light, the zeroth-order light of certain light and the first-order light of other light do not overlap with each other in the imaging element 32. Note that the wavelength band of the first-order light of at least one of the plurality of pieces of wavelength-dispersed light preferably includes a part or all of 400 to 800 nm. The reason for this is that the wavelength of fluorescence mainly used for fluorescence observation of organisms is 400 to 800 nm. However, the wavelength band is not limited thereto.

Figure 6:
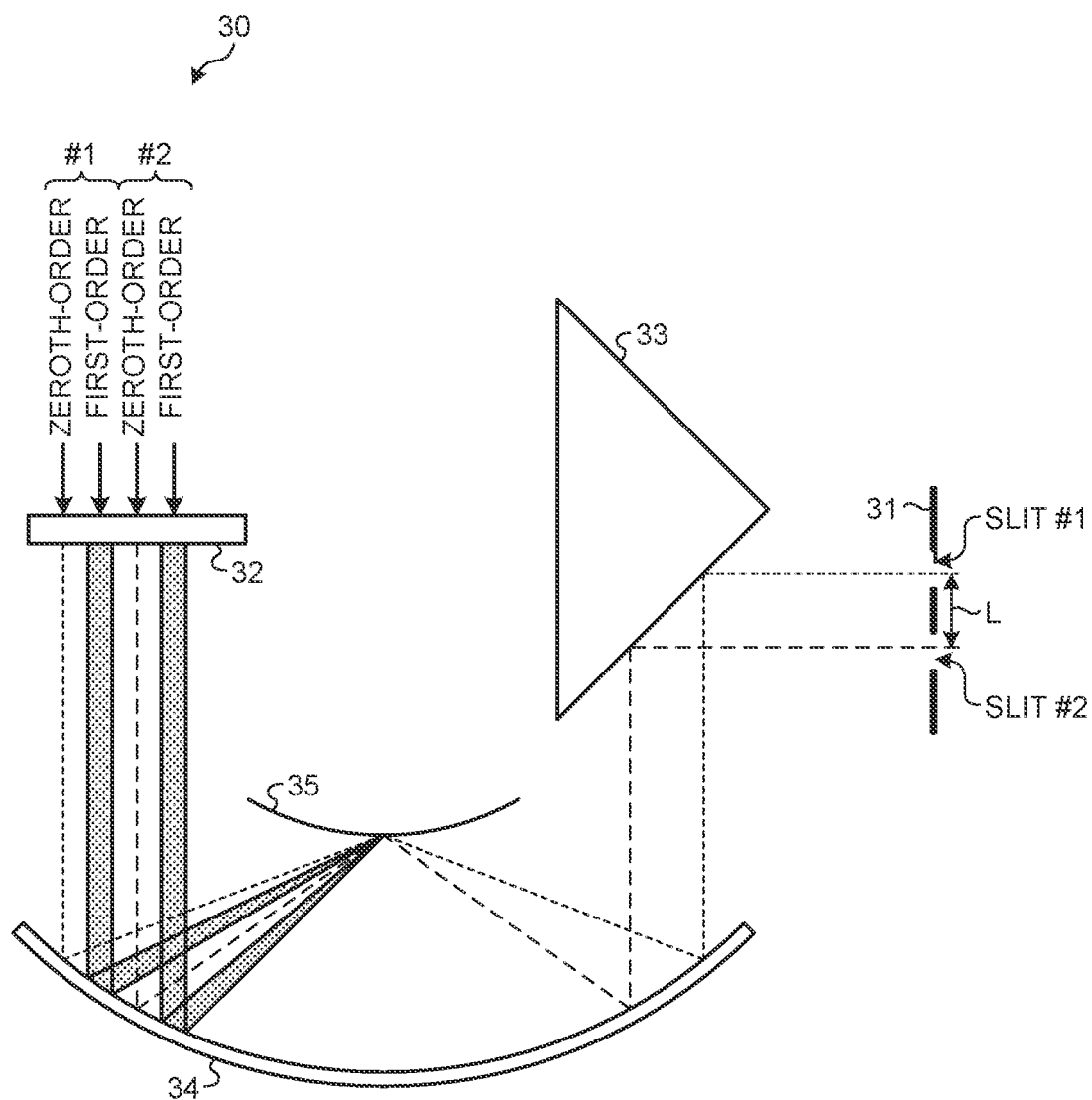
FIG. 6 is an enlarged view of a spectral imaging unit 30 in FIG. 2.
Figure 7:
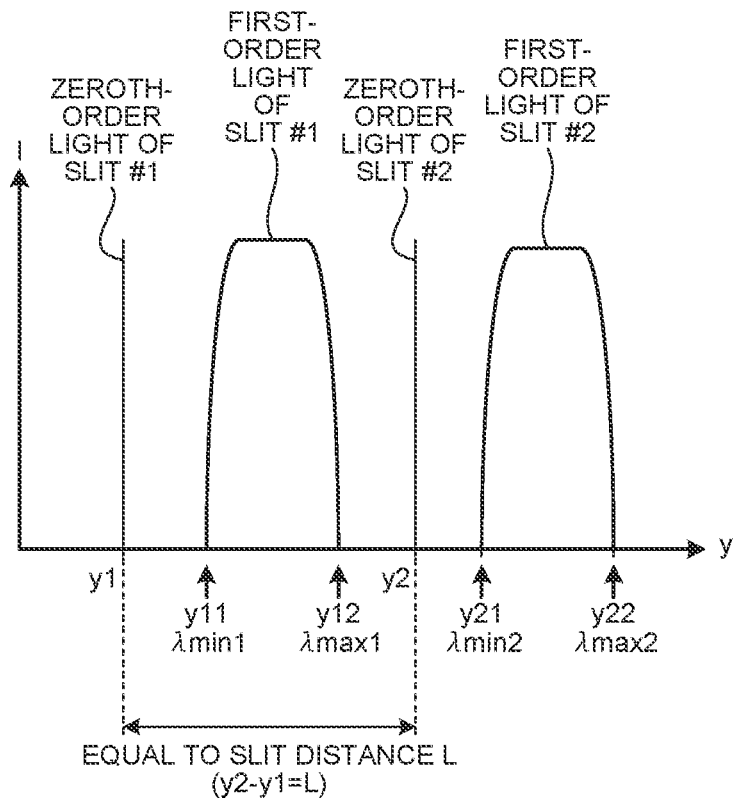
FIG. 7 is a graph illustrating positions of the zeroth-order light and the first-order light of a slit #1, and the zeroth-order light and the first-order light of a slit #2 in an imaging unit in the embodiment.

FIG. 6 is an enlarged view of the spectral imaging unit 30 in FIG. 2. Here, an example of a case where an Offner type is adopted as the spectral imaging unit 30 will be described. Also, FIG. 7 is a graph illustrating positions of the zeroth-order light and the first-order light of the slit #1 (first slit), and the zeroth-order light and the first-order light of the slit #2 (second slit) in the imaging unit (imaging element 32) in the embodiment. The horizontal axis represents a Y-coordinate position in the imaging element 32, and the vertical axis represents light intensity (I). Note that, for example, the zeroth-order light of light passing through the slit #1 is referred to as "zeroth-order light of the slit #1", and the same applies to other light.

The mirror 34 is a concave mirror having on the inner side a reflection surface with a curvature radius of R. Also, the diffraction grating 35 is a reflection type diffraction grating (convex mirror) having on the outer side a reflection surface with a curvature radius of R/2. Also, two slits, the slit #1 and the slit #2, are provided in the opening 31. The distance between the slit #1 and the slit #2 is referred to as L.

The y-coordinate position of the zeroth-order light of the slit #1 in the imaging element 32 is referred to as y1. The y-coordinate position of the zeroth-order light of the slit #2 in the imaging element 32 is referred to as y2.

The y-coordinate position of the first-order light of the slit #1 in the imaging element 32 is referred to as y11 to y12, and the wavelength band thereof is referred to as $\lambda_{min1}$ to $\lambda_{max1}$. The y-coordinate position of the first-order light of the slit #2 in the imaging element 32 is referred to as y21 to y22, and the wavelength band thereof is referred to as $\lambda_{min2}$ to $\lambda_{max2}$. The diffraction order is referred to as m.

In this case, y11, y12, y21, and y22 are expressed as in Equations (1) to (4) provided below.

$$y_{11} = \frac{R\lambda_{min1}}{2d} + y_1 \quad (5)$$

$$y_{12} = \frac{R\lambda_{max1}}{2d} + y_1 \quad (6)$$

$$y_{21} = \frac{R\lambda_{min2}}{2d} + y_2 \quad (7)$$

$$y_{22} = \frac{R\lambda_{max2}}{2d} + y_2 \quad (8)$$

Also, considering the first-order light, since the diffraction order m=1 is established, y11, y12, y21, and y22 are expressed as in Equations (5) to (8) provided below.

$$y_{11} = \frac{R\lambda_{min1}}{2d} + y_1 \quad (5)$$

$$y_{12} = \frac{R\lambda_{max1}}{2d} + y_1 \quad (6)$$

$$y_{21} = \frac{R\lambda_{min2}}{2d} + y_2 \quad (7)$$

$$y_{22} = \frac{R\lambda_{max2}}{2d} + y_2 \quad (8)$$

Figure 8:
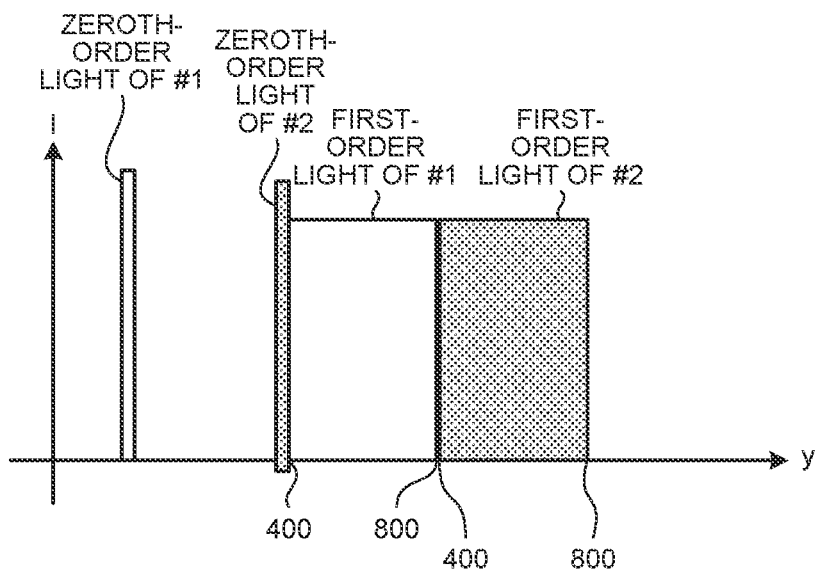
FIG. 8 is a graph illustrating a first example in the embodiment.

Here, FIG. 8 is a graph illustrating a first example in the embodiment. The first example is an example in which the observation unit 1 is configured so that the zeroth-order light of the slit #2 is located between the zeroth-order light and the first-order light of the slit #1 in the imaging element 32. In addition, L=y2−y1 is established.

The condition therefor is as illustrated in Equation (9) provided below.

$$y_1 < y_2 < y_{11}\left(= \frac{R\lambda_{min1}}{2d} + y_1\right) \quad (9)$$

When y1 is subtracted from each of the terms of Equation (9), Equation (10) provided below is obtained, which is also a condition for the slit distance L.

$$0 < y_2 - y_1 (= L) < \frac{R\lambda_{min1}}{2d} \quad (10)$$

As described above, according to the first example, as for the slits #1 and #2, since the zeroth-order light of one slit and the first-order light of the other slit do not overlap in the imaging element 32, accurate imaging data can be obtained in the imaging element 32. That is, it is possible to acquire more accurate diffraction data of the first-order light (with less noise).

Figure 9:
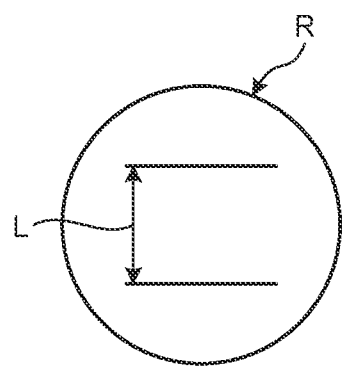
FIG. 9 is a schematic view illustrating a field of view of imaging data provided by the imaging unit in the embodiment.

Here, FIG. 9 is a schematic view illustrating a field of view of imaging data provided by the imaging unit (imaging element 32) in the embodiment. In the present embodiment, the slit distance is equal to or less than the field of view of imaging data provided by the imaging element 32 defined by the objective lens 44 and the condenser lens 46. Also, the first example has a configuration in which the slit distance between the slits #1 and #2 can be the shortest among the following second to seventh examples. The imaging performance is better at a closer area to the center in the field of view. Since the slit distance can be short, the imaging performance can further be improved.

In particular, in fluorescence observation of organisms, a fluorophore having a fluorescence peak of around 400 nm to 800 nm (for example, fluorophore Indo-1 is fluorescent at around 400 nm, and APC Alexa Fluor 750 is Fluorescent at around 800 nm) is often used. Therefore, in a case where the wavelength band of the first-order light of at least one of the plurality of pieces of wavelength-dispersed light includes a part or all of 400 to 800 nm, the accuracy of fluorescence observation of organisms can be improved.

Note that, although the configuration using the first-order light has been exemplified, the same applies to the case of using the negative-first-order light.

Figure 10:
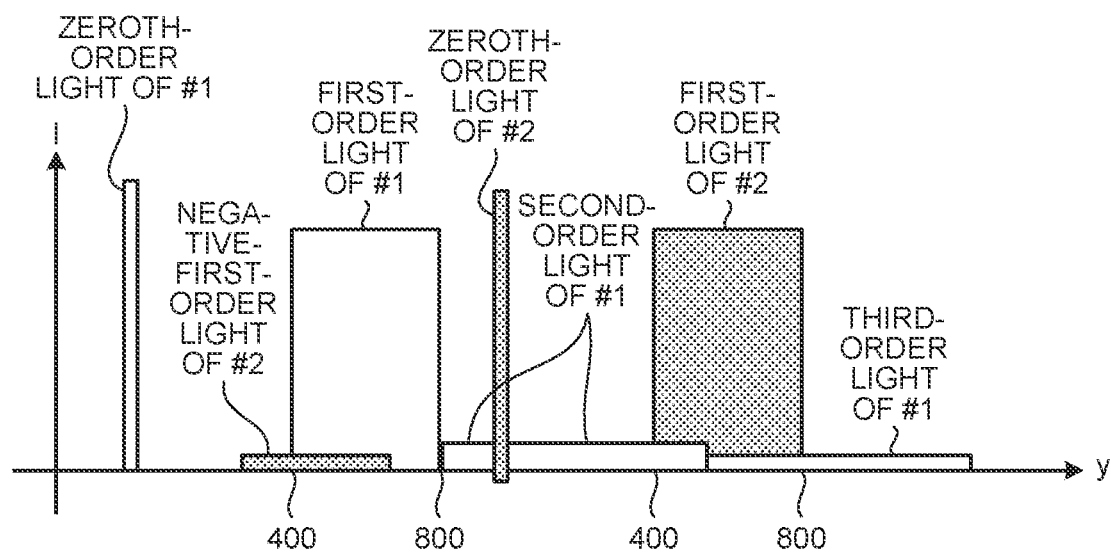
FIG. 10 is a graph illustrating a second example in the embodiment.

Next, a second example will be described. FIG. 10 is a graph illustrating a second example in the embodiment. The second example is an example in which the observation unit 1 is configured so that the zeroth-order light of the slit #2 is located further on the second-order light side than the first-order light of the slit #1 in the imaging element 32.

The condition therefor is as illustrated in Equation (11) provided below.

$$y_{12}\left(=\frac{R\lambda_{max1}}{2d}+y_1\right)<y_2 \quad (11)$$

In addition, when y1 is subtracted from each of the terms of Equation (11), and the diameter of the field of view for observation is D, the condition for the slit distance L ($=y_2-y_1$) is expressed in Equation (12) provided below.

$$\frac{R\lambda_{max1}}{2d}<y_2-y_1<D \quad (12)$$

As described above, according to the second example, as for the slits #1 and #2, since the zeroth-order light of one slit and the first-order light of the other slit do not overlap in the imaging element 32, accurate imaging data can be obtained in the imaging element 32. That is, it is possible to acquire more accurate diffraction data of the first-order light (with less noise).

Also, as described above, by using the blazed diffraction grating as the diffraction grating 35, a large amount of light of a specific order can be obtained. For example, the wavelength component of the second-order light can be suppressed. Therefore, for example, a part of the second-order light of the slit #1 overlaps with the first-order light of the slit #2, but the influence can be small.

Figure 11:
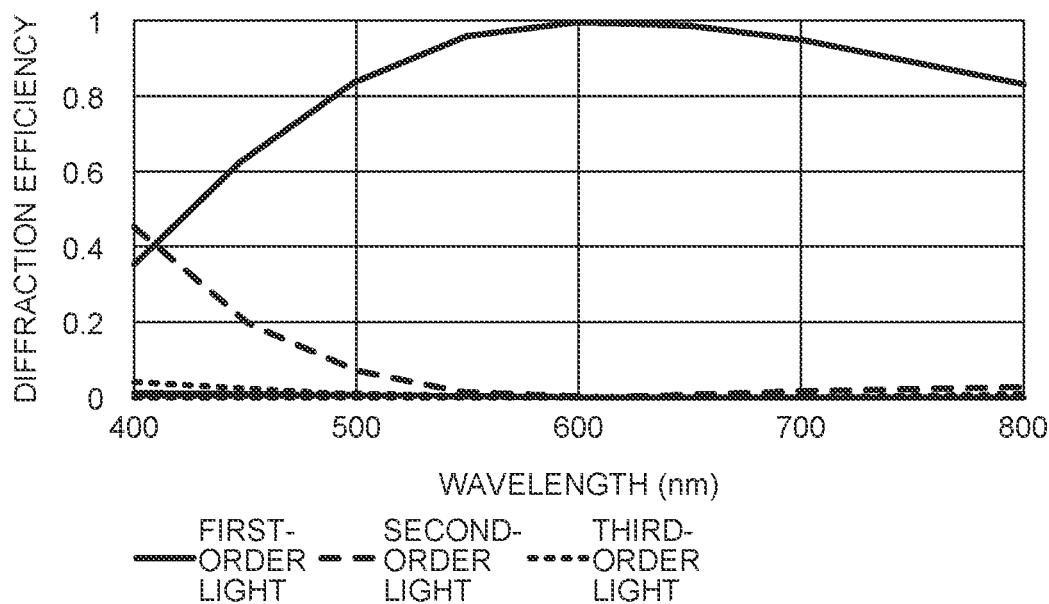
FIG. 11 is a graph illustrating a simulation example of diffraction efficiency in the embodiment.

Here, FIG. 11 is a graph illustrating a simulation example of diffraction efficiency in the embodiment. It is apparent that the diffraction efficiency of the first-order light is high, and that the diffraction efficiency of the second-order light and the diffraction efficiency of the third-order light are low. Note that, although the diffraction efficiency of the second-order light is slightly high on the short wavelength side, the influence is small because, as illustrated in FIG. 10, the portion where the second-order light of the slit #1 overlaps with the first-order light of the slit #2 is on the long wavelength side. Therefore, the influence of color mixing can be small, and an accurate spectrum can be acquired. Also, in a case where the blazed diffraction grating is used, the diffraction efficiencies of the negative-first-order light to the negative-third-order light can be made negligibly small.

Also, the second example has a configuration in which the slit distance between the slits #1 and #2 can be shorter than the following third to seventh examples although it is not as short as the first example, and high image forming performance can be achieved.

Hereinbelow, third to seventh examples will be described, but description of the equations will be omitted since they are similar to those in the first or second example.

Figure 12:
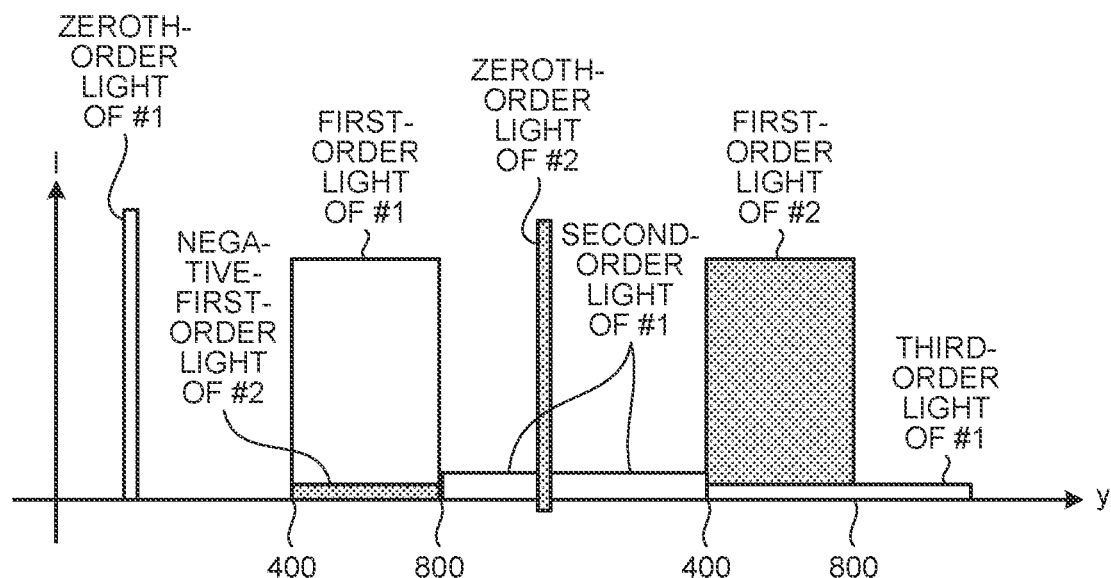
FIG. 12 is a graph illustrating a third example in the embodiment.

A third example will be described. FIG. 12 is a graph illustrating a third example in the embodiment. The third example is an example in which the observation unit 1 is configured so that the second-order light of the slit #1 does not overlap with and the third-order light of the slit #1 overlaps with the first-order light of the slit #2, as compared with the second example.

In general, the diffraction efficiency of diffracted light is lower as the order is higher. Therefore, since not the second-order light but the third-order light of the slit #1 overlaps with the first-order light of the slit #2, the accuracy of the imaging data can further be improved. Note that the slit distance may be determined within a range in which sufficient image forming performance can be secured.

Figure 13:
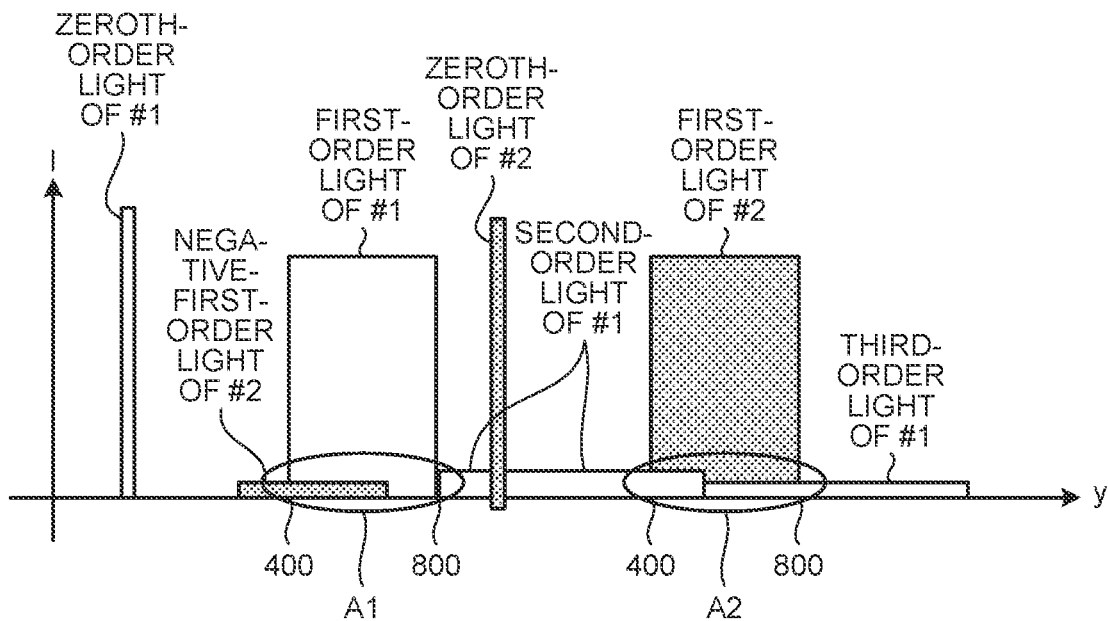
FIG. 13 is a graph illustrating a fourth example in the embodiment.

Next, a fourth example will be described. FIG. 13 is a graph illustrating a fourth example in the embodiment. The graph itself is similar to that in FIG. 10. Here, a method of suppressing by data correction the influence of mixing of higher-order light between the slits is considered. For example, the wavelength and intensity of higher-order light overlapping with the first-order light of the slit #1 (region A) and the first-order light of the slit #2 (region B) are evaluated (calculated) in advance. By correcting the data of the color mixing portion on the basis of this evaluation, an accurate spectrum can be acquired even in a case where the color mixing occurs.

Although color mixing between the plurality of slits has been described here, the second-order light and the first-order light may overlap with each other in one slit. This can be handled by evaluating an overlapping portion in advance and performing data correction similarly to the above-described method, or by limiting a wavelength band that reaches the imaging element 32 using an optical filter for fluorescence from the observation target. These may be combined.

Figure 14:
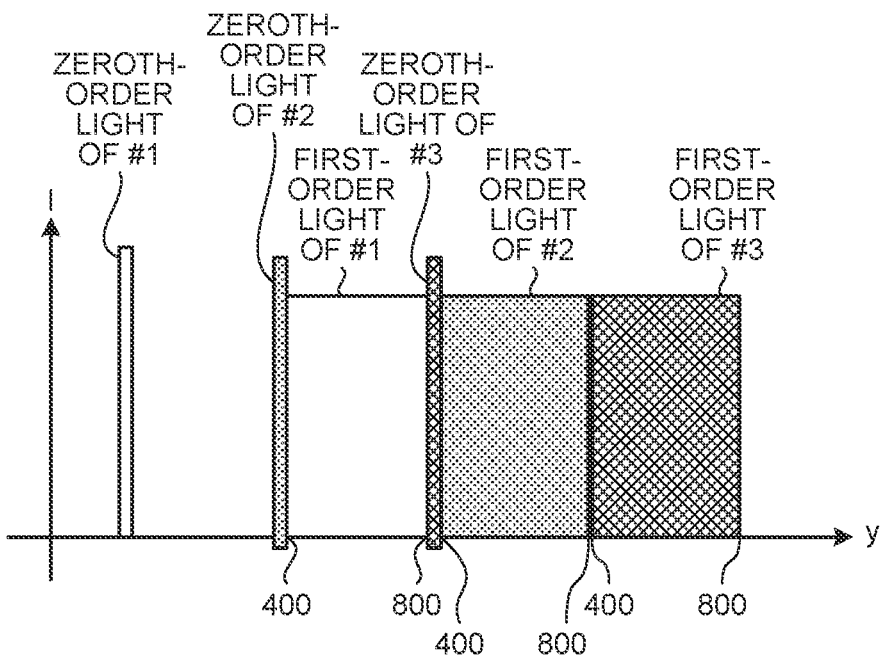
FIG. 14 is a graph illustrating a fifth example in the embodiment.

Next, a fifth example will be described. FIG. 14 is a graph illustrating a fifth example in the embodiment. The case where the number of slits is two has been described above, but the number of slits may be three or more. The example in FIG. 14 illustrates a case where the number of slits is three in the first example. The first-order light of the slit #1 is arranged between the zeroth-order light of the slit #2 and the zeroth-order light of the slit #3.

Note that the distances of the three pieces of first-order light are not necessarily the same, and can be set to be different. Therefore, the slit distances are not necessarily the same, and may be different.

As described above, according to the fifth example, since the zeroth-order light of a certain slit and the first-order light of another slit do not overlap even in a case where the number of slits is three, accurate imaging data can be obtained in the imaging element 32. That is, it is possible to acquire more accurate diffraction data of the first-order light (with less noise).

Figure 15:
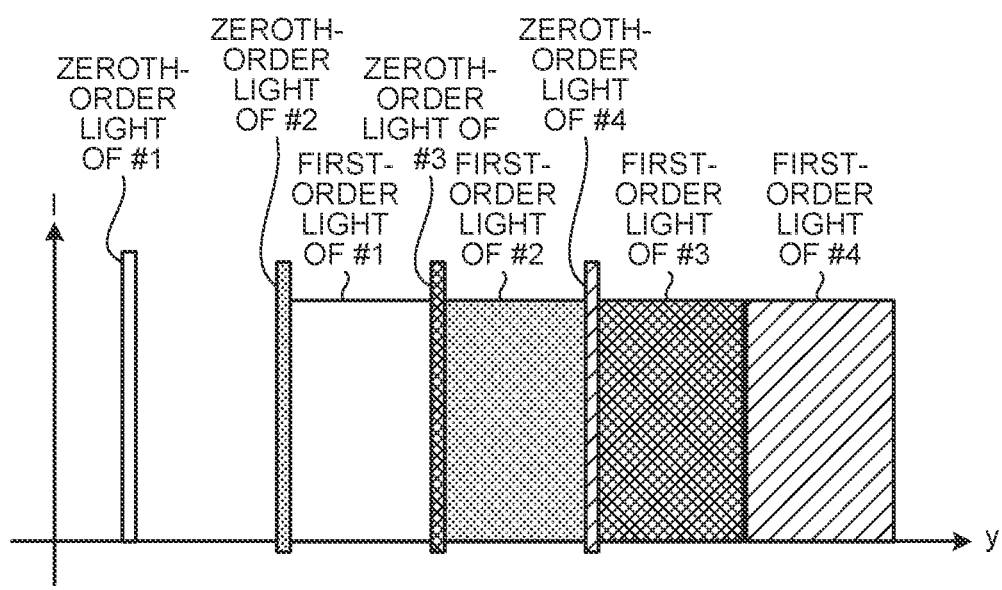
FIG. 15 is a graph illustrating a sixth example in the embodiment.

Next, a sixth example will be described. FIG. 15 is a graph illustrating a sixth example in the embodiment. The example in FIG. 15 illustrates a case where the number of slits is four in the first example. The first-order light of the slit #2 is arranged between the zeroth-order light of the slit #3 and the zeroth-order light of the slit #4.

As described above, according to the sixth example, since the zeroth-order light of a certain slit and the first-order light of another slit do not overlap even in a case where the number of slits is four, accurate imaging data can be obtained in the imaging element 32. That is, it is possible to acquire more accurate diffraction data of the first-order light (with less noise). Note that the same can be achieved in a case where the number of slits is five or more.

Figure 16:
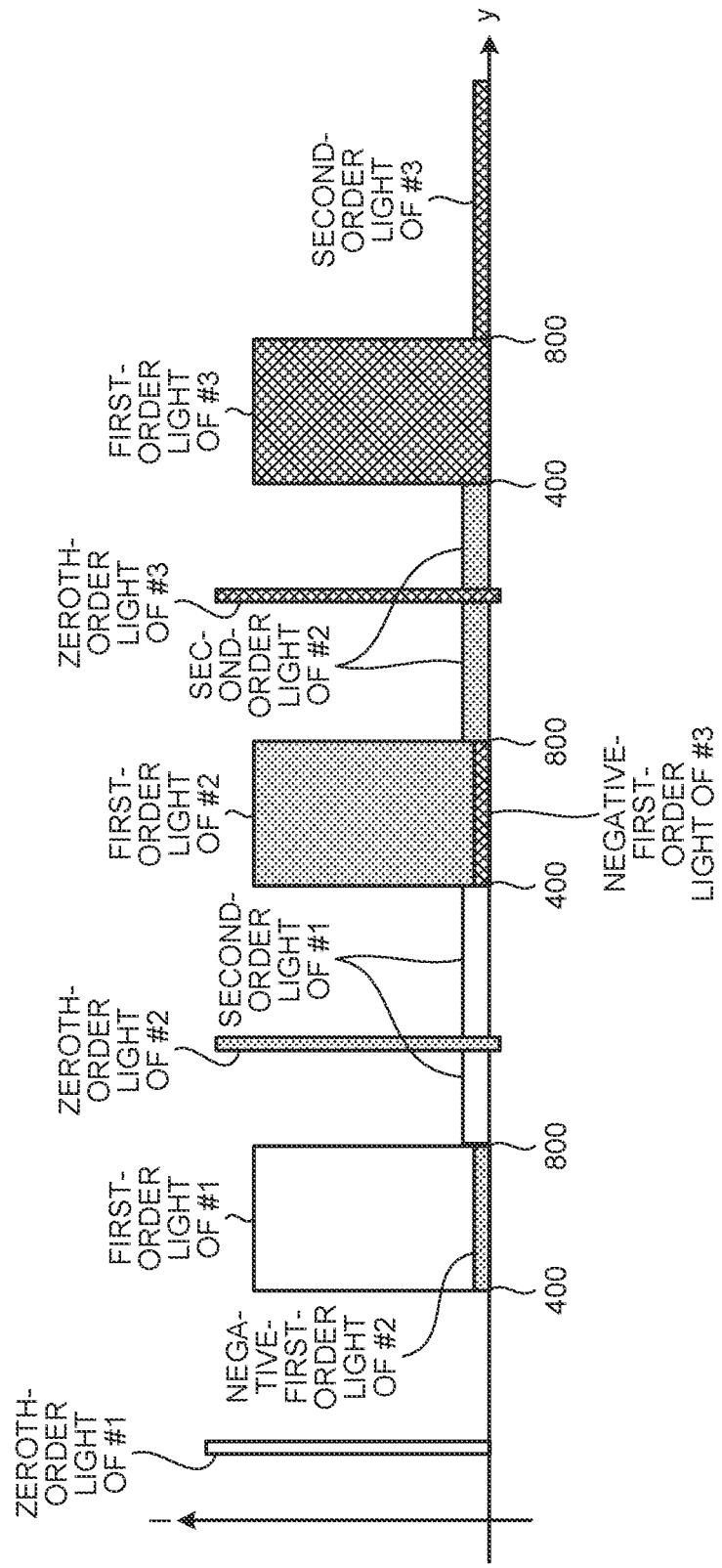
FIG. 16 is a graph illustrating a seventh example in the embodiment.

Next, a seventh example will be described. FIG. 16 is a graph illustrating a seventh example in the embodiment. In the example in FIG. 16, the zeroth-order light of the slit #2 is arranged in the region of the second-order light of the slit #1, and the zeroth-order light of the slit #3 is arranged in the region of the second-order light of the slit #2.

Note that the distances of the three pieces of first-order light are not necessarily the same, and can be set to be different. Therefore, the slit distances are not necessarily the same, and may be different.

As described above, according to the seventh example, since the zeroth-order light of a certain slit and the first-order light of another slit do not overlap even in a case where the number of slits is three, accurate imaging data can be obtained in the imaging element 32. That is, it is possible to acquire more accurate diffraction data of the first-order light (with less noise). Note that the same can be achieved in a case where the number of slits is four or more.

Figure 17:
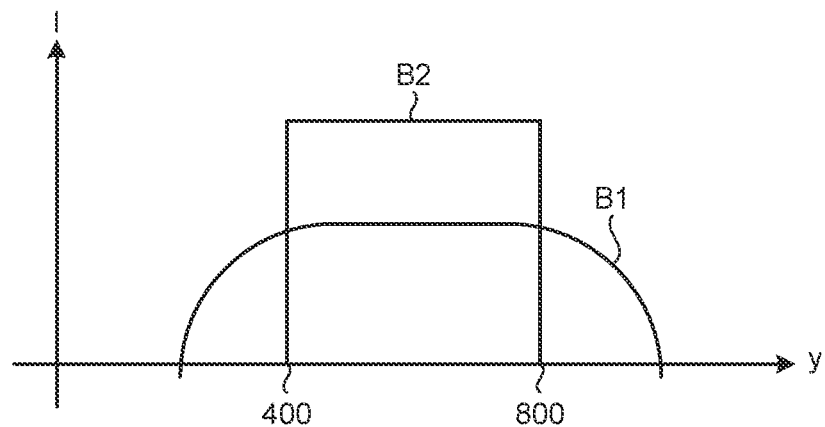
FIG. 17 is a graph for describing limitation of a wavelength range to be observed in the embodiment.

Next, FIG. 17 is a graph for describing limitation of a wavelength range to be observed in the embodiment. The observation unit 1 may further include an optical filter that allows only light in a predetermined wavelength range out of the obtained fluorescence pass through.

The actual fluorescence from the observation target may spread over a wide band. In this case, the wavelength range to be observed can be limited by using the optical filter or adjusting the sensitivity of the light receiving element. Specifically, for example, the following methods (A) to (C) are conceivable.

(A) An optical filter is arranged in a portion of the emission spectrum to limit the wavelength.

(B) The sensitivity characteristic of the light receiving element is used to limit the wavelength to be observed.

(C) The methods (A) and (B) are combined.

By using these methods, for example, as illustrated in FIG. 17, the fluorescence in the region B1 can be limited and acquired as data in the region B2.

Figure 18:
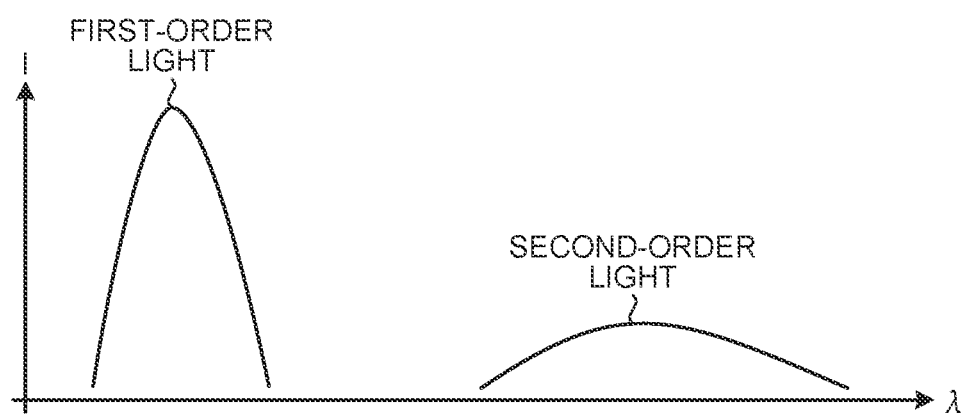
FIG. 18 is a graph for describing data correction for the second-order light in the embodiment.

Next, FIG. 18 is a graph for describing data correction for the second-order light in the embodiment. The horizontal axis represents wavelength, and the vertical axis represents intensity of light. The processing unit 2 can estimate the generated amount of the second-order light from the amount of the first-order light in terms of the same light.

By acquiring the diffraction characteristic of the diffraction grating 35 in advance, the generated amount of the second-order light of the slit #1 can be estimated from the amount of the first-order light of the slit #1, for example. That is, for example, in a case where the first-order light of the slit #2 overlaps with the second-order light of the slit #1, the signal of the first-order light of the slit #2 can more accurately be acquired by the data processing.

Specifically, although the efficiency of the second-order light is different from that of the first-order light, the waveform of the second-order light, which is the same waveform as that of the first-order light, appears in a wavelength region twice as long as that of the first-order light. Therefore, by evaluating the appearance ratio of the second-order light with respect to the first-order light in advance, it is possible to calculate how much second-order light is generated in actual measurement. In Equation (13) provided below, the left-hand side indicates the intensity of the second-order light, the first term of the right-hand side indicates the intensity of the first-order light, and the second term of the right-hand side indicates the appearance ratio of the second-order light.

$$I_2(2\lambda)=I_1(\lambda)\times\eta_2(\lambda) \quad (13)$$

In this manner, by calculating (estimating) the second-order light from the measurement result of the first-order light with high accuracy, high-accuracy data correction can be performed.

Next, FIGS. 19A and 19B are graphs for describing a specific example of data correction for the second-order light in the embodiment. An example of a second-order light appearance ratio evaluation method will be described. For example, a filter that blocks light in a second-order light region to be evaluated is placed in a light source having a broad emission wavelength characteristic such as a halogen lamp. This light is individually introduced into the slit of the spectroscope. In this manner, the ratio of the second-order light to the first-order light can be evaluated, and the appearance ratio of the second-order light can be evaluated.

In FIG. 19A, reference sign C1 represents the original light source spectrum, reference sign C2 represents the light source spectrum after filtering, and reference sign C3 represents the second-order light appearance ratio evaluation region. Also, In FIG. 19B, reference sign C4 represents the light source spectrum after filtering, and reference sign C5 represents the second-order light of the light source after filtering. The ratio of reference sign C5 to reference sign C4 is the appearance ratio of the second-order light.

Also, as an alternative to this method, for example, there is also a method of deriving the appearance ratio of the second-order light for each wavelength using a method of continuously extracting a monochromatic wavelength from a high-luminance white light source.

Figure 20:
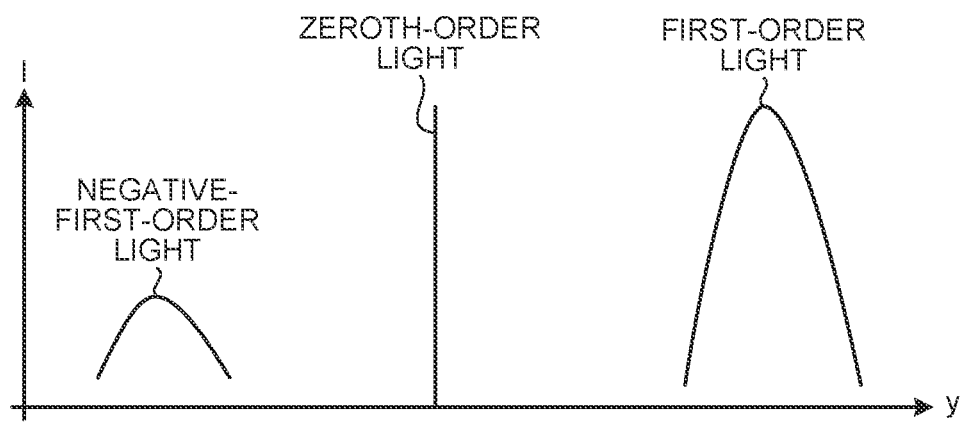
FIG. 20 is a graph for describing data correction for the negative-first-order light in the embodiment.

Next, FIG. 20 is a graph for describing data correction for the negative-first-order light in the embodiment. Although the efficiency of the negative-first-order light is different from that of the first-order light, the waveform of the negative-first-order light, which is the same waveform z as that of the first-order light, appears symmetrically with respect to the zeroth-order light. By evaluating the appearance ratio of the negative-first-order light to the first-order light in advance, it is possible to calculate how much negative-first-order light is generated in actual measurement. In Equation (14) provided below, the left-hand side indicates the intensity of the negative-first-order light, the first term of the right-hand side indicates the intensity of the first-order light, and the second term of the right-hand side indicates the appearance ratio of the negative-first-order light.

$$I_{-1}(\lambda)=I_1(\lambda)\times\eta_{-1}(\lambda) \quad (14)$$

An example of a method of evaluating the appearance ratio of the negative-first-order light to the first-order light will be described. When wide band light such as halogen lamp light is introduced into one slit, the spectrum of the dispersed first-order light appears in data acquired from the imaging element 32. At this time, the negative-first-order light is simultaneously generated. With this information, the appearance ratio of the negative-first-order light to the first-order light can be evaluated. This is evaluated for each slit.

As an alternative to this method, there is also a method of deriving the appearance ratio of the negative-first-order light for each wavelength using a method of continuously extracting a monochromatic wavelength from a high-luminance white light source.

Figure 21:
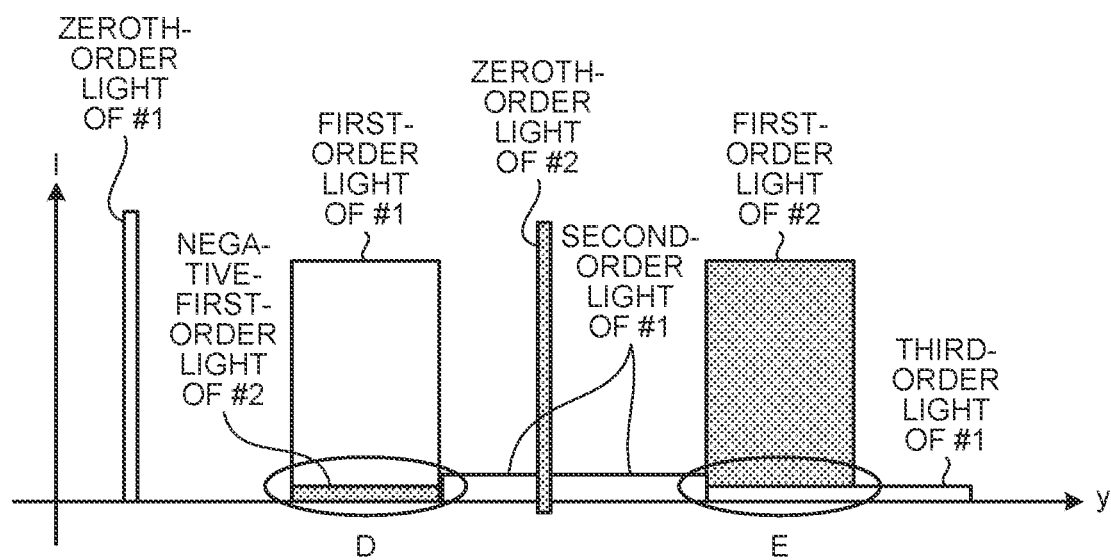
FIG. 21 is a graph for describing a specific example of data correction in the embodiment.

Next, FIG. 21 is a graph for describing a specific example of data correction in the embodiment. Here, data correction in the case of FIG. 12 will be described. $I_D$ is the light intensity of the region D and is actual measurement data. $I_1$ is the intensity of the first-order light of the slit #1. $I_2$ is the intensity of the first-order light of the slit #2. $\beta_{-1}$ is the appearance ratio of the negative-first-order light of the slit #2 and is a correction coefficient evaluated in advance.

Also, $I_E$ is the light intensity of the region E and is actual measurement data. $\alpha_3$ is the appearance ratio of the third-order light of the slit #1 and is a correction coefficient evaluated in advance. Then, $I_1$ and $I_2$ can be calculated by Equations (15) and (16) provided below.

$$I_D = I_1 + I_2 \beta_{-1} \quad (15)$$

$$I_E = I_2 + I_1 \alpha_3 \quad (16)$$

Note that the prior evaluation of $\beta_{-1}$ and $\alpha_3$ can be performed by applying the evaluation method for the second-order light described in FIG. 18 or the evaluation method for the negative-first-order light described in FIG. 20.

In this manner, since the observation unit 1 according to the present embodiment is configured so that, as for a plurality of pieces of wavelength-dispersed light, the zeroth-order light of certain light and the first-order light of other light do not overlap with each other in the imaging element 32, accurate imaging data can be obtained in the imaging element 32.

For example, in a case where fluorescence microscopy using a plurality of pieces of excitation light and a plurality of slits is used in a conventional line scan type fluorescence imaging device, there is a problem in which light pieces from the plurality of slits are mixed with each other, and in which accurate spectral data cannot be acquired. Conversely, by using the method according to the present embodiment, more accurate data in which color mixing is suppressed can be acquired.

Note that, conventionally, only one line (or point) of light can be dispersed by one spectroscope. Therefore, in order to acquire spectral data for a plurality of lines (or points) simultaneously, it is necessary to arrange a plurality of spectroscopes. This is a complicated system and sets a great limitation on a physical layout. It is substantially difficult to arrange a plurality of such spectroscopes in an observation system such as a microscope.

Conversely, according to the present embodiment, a plurality of lines (or points) of light can accurately be dispersed by one spectroscope (the diffraction grating 35, the imaging element 32, and the like). This enables the device to become simple, a compact layout to be achieved, and multiple lines of light to be dispersed simultaneously. In the fluorescent observation, in the conventional art, scanning one line over the entire surface and photographing is repeatedly performed as many times as the number of excitation wavelengths, and a large amount of time is required. However, in a case where different excitation wavelengths are used for multiple lines, imaging can be completed in single scanning for excitation of multiple colors. That is, the observation time can significantly be shortened.

Also, in the present embodiment, as illustrated in the specific example in FIG. 9, by configuring the observation unit 1 so that the zeroth-order light of light passing through one slit is located between the zeroth-order light and the first-order light of light passing through another slit, the above-described effects can be achieved.

Also, as illustrated in the example in FIG. 10, by configuring the observation unit 1 so that the zeroth-order light of light passing through one slit is located further on the second-order light side than the first-order light of light passing through another slit, the above-described effects can be achieved.

Also, as for imaging data respectively obtained from a plurality of pieces of wavelength-dispersed light, by correcting imaging data obtained from other light on the basis of imaging data obtained from certain light, the accuracy of the imaging data can further be improved.

Also, by further using an optical filter that allows only light in a predetermined wavelength range out of the obtained fluorescence pass through, the accuracy of the imaging data can further be improved.

Also, a case where the wavelength band of the first-order light of at least one of the plurality of pieces of wavelength-dispersed light includes a part or all of 400 to 800 nm is effective in a case where the observation target is an organism.

Also, by using the diffraction grating as a dispersion element, it is possible to easily design how the wavelength dispersion is to occur when light is incident on the imaging element 32.

Also, by using the blazed diffraction grating as the diffraction grating 35, a large amount of light of a specific order can be obtained, and even when there is a region where the higher-order light overlaps with the first-order light, the influence can be suppressed to be small.

Also, by setting the slit distance of the opening 31 to be equal to or less than the field of view of imaging data, the imaging data based on the plurality of pieces of excitation light can accurately be acquired.

Also, by including the scanning mechanism 50, two-dimensional data or three-dimensional data of the observation target can be acquired.

Also, the fluorescence observation device 100 and a program used for processing imaging data constitute a fluorescence observation system (microscope system). This program is a program for causing an information processing device to execute correction processing for processing imaging data.

This program is provided in a state of being stored in a recording medium such as a magnetic disk, an optical disk, a magneto-optical disk, and a flash memory, and is used by being downloaded to an electronic computer or the like connected to the fluorescence observation device 100.

Also, this program may be downloaded to an external electronic computer or the like via a network such as the Internet and used.

Note that the present technique can also employ the following configuration.

(1)

A microscope device comprising:
- an opening that includes a first slit and a second slit through which a plurality of pieces of light from an observation target resulting from a plurality of pieces of irradiation light emitted to the observation target and having different wavelengths pass;
- a dispersion element that wavelength-disperses the plurality of pieces of light passing through the opening; and an imaging element that receives the plurality of pieces of light wavelength-dispersed by the dispersion element,
wherein the imaging element performs light reception so that, as for the plurality of pieces of light wavelength-dispersed, zeroth-order light of light passing through the second slit and first-order light of light passing through the first slit do not overlap with each other.

(2)
The microscope device according to (1), further comprising an irradiation unit that irradiates the observation target with the plurality of pieces of irradiation light having different wavelengths.

(3)
The microscope device according to (1), further comprising a correction unit that processes imaging data received from the imaging element.

(4)
The microscope device according to (1), wherein the imaging element performs light reception so that the zeroth-order light of the light passing through the second slit is located between zeroth-order light and the first-order light of the light passing through the first slit.

(5)
The microscope device according to (1), wherein the imaging element performs light reception so that the zeroth-order light of the light passing through the second slit is located further on a second-order light side than the first-order light of the light passing through the first slit.

(6)
The microscope device according to (3), wherein, as for light information respectively obtained from the plurality of pieces of light wavelength-dispersed, the correction unit corrects light information obtained from the light passing through the first slit on a basis of light information obtained from the light passing through the second slit.

(7)
The microscope device according to (1), further comprising an optical filter that allows only light in a predetermined wavelength range out of the plurality of pieces of light from the observation target pass through.

(8)
The microscope device according to (1), wherein a wavelength band of first-order light of at least one of the plurality of pieces of light wavelength-dispersed includes a part or all of 400 to 800 nm.

(9)
The microscope device according to (1), wherein the dispersion element is a diffraction grating that causes wavelength dispersion due to coherence of light.

(10)
The microscope device according to (9), wherein the diffraction grating is a blazed diffraction grating in which a cross-sectional shape of a groove is a sawtooth shape.

(11)
The microscope device according to (1), wherein the imaging element receives a plurality of pieces of fluorescence obtained by irradiating the observation target with excitation light serving as a plurality of pieces of the irradiation light having different wavelengths.

(12)
The microscope device according to (1), wherein a slit distance of the opening is equal to or less than a field of view of imaging data provided by the imaging element defined by an objective lens and an image forming lens.

(13)
The microscope device according to (3), further comprising a scanning mechanism that changes a position of the observation target irradiated with the irradiation light over time,
wherein, by driving the scanning mechanism, the imaging element continuously images the plurality of pieces of light wavelength-dispersed in a scanning direction over time, and the correction unit processes the imaging data received from the imaging element to acquire two-dimensional data or three-dimensional data of the observation target.

(14)
The microscope device according to (2), wherein the irradiation unit emits excitation light serving as a plurality of pieces of the irradiation light having different wavelengths in a line form.

(15)
A spectroscope in a microscope device, comprising:
an opening that includes a first slit and a second slit through which a plurality of pieces of light from an observation target resulting from a plurality of pieces of irradiation light emitted to the observation target and having different wavelengths pass;
a dispersion element that wavelength-disperses the plurality of pieces of light passing through the opening; and
an imaging element that receives the plurality of pieces of light wavelength-dispersed by the dispersion element,
wherein the imaging element performs light reception so that, as for the plurality of pieces of light wavelength-dispersed, zeroth-order light of light passing through the second slit and first-order light of light passing through the first slit do not overlap with each other.

(16)
A microscope system comprising: the microscope device according to any one of (1) to (14); and a program used for processing imaging data imaged by the microscope device,
wherein the program is a program for causing an information processing device to execute correction processing for processing the imaging data.

Although the embodiments of the present disclosure have been described above, the technical scope of the present disclosure is not limited to the above-described embodiments, and various modifications can be made without departing from the gist of the present disclosure.

For example, FIG. 6 illustrates an example of a case where the Offner type is adopted as the spectral imaging unit 30, and the curvature radius of the reflection surface on the outer side of the diffraction grating 35 is half the curvature radius of the reflection surface on the inner side of the mirror 34, but the present disclosure is not limited thereto. Depending on the design, the ratio of their curvature radii may be other than 2:1.

Further, the effects of the respective embodiments described in the present specification are illustrative only and are not limited, and other effects may be provided.

REFERENCE SIGNS LIST

1 OBSERVATION UNIT
2 PROCESSING UNIT
3 DISPLAY UNIT
10 EXCITATION UNIT
11 COLLIMATOR LENS
12 LASER LINE FILTER
13 DICHROIC MIRROR
14 HOMOGENIZER
15 CONDENSER LENS

16 INCIDENT SLIT
20 STAGE
21 STORAGE UNIT
22 DATA CALIBRATION UNIT
23 IMAGE FORMING UNIT
30 SPECTRAL IMAGING UNIT
31 OPENING
32 IMAGING ELEMENT
33 PRISM
34 MIRROR
35 DIFFRACTION GRATING
40 OBSERVATION OPTICAL SYSTEM
41 CONDENSER LENS
42 DICHROIC MIRROR
43 DICHROIC MIRROR
44 OBJECTIVE LENS
45 BANDPASS FILTER
46 CONDENSER LENS
50 SCANNING MECHANISM
60 FOCUS MECHANISM
70 NON-FLUORESCENCE OBSERVATION UNIT
80 CONTROL UNIT

The invention claimed is:

1. A microscope device comprising:
an opening that includes a first slit and a second slit through which a plurality of pieces of light from an observation target resulting from a plurality of pieces of irradiation light emitted to the observation target and having different wavelengths pass;
a dispersion element that wavelength-disperses the plurality of pieces of light passing through the opening; and
an imaging element that receives the plurality of pieces of light wavelength-dispersed by the dispersion element,
wherein the imaging element performs light reception so that, as for the plurality of pieces of light wavelength-dispersed, zeroth-order light of light passing through the second slit and first-order light of light passing through the first slit do not overlap with each other.

2. The microscope device according to claim 1, further comprising an irradiation unit that irradiates the observation target with the plurality of pieces of irradiation light having different wavelengths.

3. The microscope device according to claim 2, wherein the irradiation unit emits excitation light serving as a plurality of pieces of the irradiation light having different wavelengths in a line form.

4. The microscope device according to claim 1, further comprising a correction unit that processes imaging data received from the imaging element.

5. The microscope device according to claim 4, wherein, as for light information respectively obtained from the plurality of pieces of light wavelength-dispersed, the correction unit corrects light information obtained from the light passing through the first slit on a basis of light information obtained from the light passing through the second slit.

6. The microscope device according to claim 4, further comprising
a scanning mechanism that changes a position of the observation target irradiated with the irradiation light over time,
wherein, by driving the scanning mechanism, the imaging element continuously images the plurality of pieces of light wavelength-dispersed in a scanning direction over time, and the correction unit processes the imaging data received from the imaging element to acquire two-dimensional data or three-dimensional data of the observation target.

7. The microscope device according to claim 1, wherein the imaging element performs light reception so that the zeroth-order light of the light passing through the second slit is located between zeroth-order light and the first-order light of the light passing through the first slit.

8. The microscope device according to claim 1, wherein the imaging element performs light reception so that the zeroth-order light of the light passing through the second slit is located further on a second-order light side than the first-order light of the light passing through the first slit.

9. The microscope device according to claim 1, further comprising an optical filter that allows only light in a predetermined wavelength range out of the plurality of pieces of light from the observation target pass through.

10. The microscope device according to claim 1, wherein a wavelength band of the first-order light of at least one of the plurality of pieces of light wavelength-dispersed includes a part or all of 400 to 800 nm.

11. The microscope device according to claim 1, wherein the dispersion element is a diffraction grating that causes wavelength dispersion due to coherence of light.

12. The microscope device according to claim 11, wherein the diffraction grating is a blazed diffraction grating in which a cross-sectional shape of a groove is a sawtooth shape.

13. The microscope device according to claim 1, wherein the imaging element receives a plurality of pieces of fluorescence obtained by irradiating the observation target with excitation light serving as a plurality of pieces of the irradiation light having different wavelengths.

14. The microscope device according to claim 1, wherein a slit distance of the opening is equal to or less than a field of view of imaging data provided by the imaging element defined by an objective lens and an image forming lens.

15. A microscope system comprising: the microscope device according to claim 1; and a program used for processing imaging data imaged by the microscope device,
wherein the program is a program for causing an information processing device to execute correction processing for processing the imaging data.

16. A spectroscope in a microscope device, comprising:
an opening that includes a first slit and a second slit through which a plurality of pieces of light from an observation target resulting from a plurality of pieces of irradiation light emitted to the observation target and having different wavelengths pass;
a dispersion element that wavelength-disperses the plurality of pieces of light passing through the opening; and
an imaging element that receives the plurality of pieces of light wavelength-dispersed by the dispersion element,
wherein the imaging element performs light reception so that, as for the plurality of pieces of light wavelength-dispersed, zeroth-order light of light passing through the second slit and first-order light of light passing through the first slit do not overlap with each other.

* * * * *